United States Patent
Zepter

(10) Patent No.: US 7,086,552 B2
(45) Date of Patent: Aug. 8, 2006

(54) HIGH-FUNCTIONALITY BOWL STRUCTURE

(76) Inventor: Philip Zepter, Sun Tower, 7, Avenue Princesse Alice, MC-98000 Monaco (MC)

( * ) Notice: Subject to any disclaimer, the term of this patent is extended or adjusted under 35 U.S.C. 154(b) by 0 days.

(21) Appl. No.: 10/401,174

(22) Filed: Mar. 27, 2003

(65) Prior Publication Data

US 2003/0230588 A1 Dec. 18, 2003

(30) Foreign Application Priority Data

Mar. 27, 2002 (IT) .......................... MI2002U0165

(51) Int. Cl.
*A47J 27/10* (2006.01)
(52) U.S. Cl. .................................. 220/573.4
(58) Field of Classification Search ............. 220/573.1, 220/573.4, 672, 675
See application file for complete search history.

(56) References Cited

U.S. PATENT DOCUMENTS

| 1,560,893 | A | * | 11/1925 | Bonoff | 219/475 |
| D148,627 | S | * | 2/1948 | La Mont | D7/360 |
| 3,612,036 | A | * | 10/1971 | Kaufman | 126/390.1 |
| 4,350,259 | A | | 9/1982 | Cartossi | |
| 4,666,727 | A | * | 5/1987 | Wang | 426/523 |
| 5,224,623 | A | * | 7/1993 | LaFleur | 220/669 |
| 5,381,901 | A | * | 1/1995 | Hundley | 206/457 |
| 5,647,271 | A | | 7/1997 | Capelle et al. | |
| D418,017 | S | * | 12/1999 | Henry | D7/545 |
| D457,777 | S | * | 5/2002 | Bradley | D7/354 |

FOREIGN PATENT DOCUMENTS

| CH | 354714 | 11/1955 |
| FR | 908226 | 8/1945 |
| FR | 673479 | 12/1965 |
| GB | 261268 | 4/1926 |
| GB | 2121674 | 6/1983 |
| GB | 2302263 | 6/1995 |
| RU | 2143833 | 1/2000 |
| SU | 1729467 | 4/1992 |

* cited by examiner

*Primary Examiner*—Stephen Castellano
(74) *Attorney, Agent, or Firm*—Myers Dawes Andras & Sherman LLP; Joseph C. Andras

(57) ABSTRACT

High-functionality bowl structure comprising a hollow containment body capable of containing food to be cooked or warmed, the said hollow containment body having a base, the peculiarity of which is that it comprises a thermal base fixed to the said base and capable of transmitting heat from an external heat source into the said hollow containment body.

6 Claims, 1 Drawing Sheet

HIGH-FUNCTIONALITY BOWL STRUCTURE

BACKGROUND OF THE INVENTION

The present innovation relates to a high-functionality bowl structure. More particularly the innovation relates to a bowl structure that can be used directly either on a conventional heat source or for induction heating.

As is known, makers of kitchen pots and pans are keen to produce products of increasing efficiency from the point of view of use.

In particular, there is no bowl currently on the market that can be used both directly on a heat source, to cook the food contained in it, and to warm the food contained in it in a bain-marie, very quickly without having to change the container.

Briefly, there are currently in existence structures for bowls or pans that can be placed directly on the heat source, e.g. a stove, or which can alternatively be used for bain-marie warming, that is partly immersed in another container which in turn is placed in direct contact with the heat source.

BRIEF SUMMARY OF THE INVENTION

It is a primary task of the present innovation to provide a high-functionality bowl structure that can be used both on a traditional source of heat or for bain-marie purposes, very quickly and without having to change the bowl.

In the context of this task, an object of the present innovation is to provide a high-functionality bowl structure in which the cooked food can also be kept in a refrigerator.

Another object of the present innovation is to provide a bowl structure that can also be used to serve the food at the table, the bowl keeping the food hot for a prolonged period of time.

Not the last object of the present innovation is to provide a bowl structure of great reliability that is simple to produce and competitively prices.

This task, and these and other objects which will become clearer in the course of the text, are achieved by a high-functionality bowl structure comprising a hollow containment body capable of containing food to be cooked or warmed, which hollow containment body has a base, the said structure being characterized in that it comprises a thermal base fixed to the said base capable of transmitting heat from an external heat source into the said hollow containment body.

Other features and advantages of the innovation will become clearer in the course of the description of the structure 18 according to the present innovation, which is illustrated by way of non-restrictive indication in the accompanying drawings, in which:

DESCRIPTION OF THE PREFERRED EMBODIMENT

Figure 1:
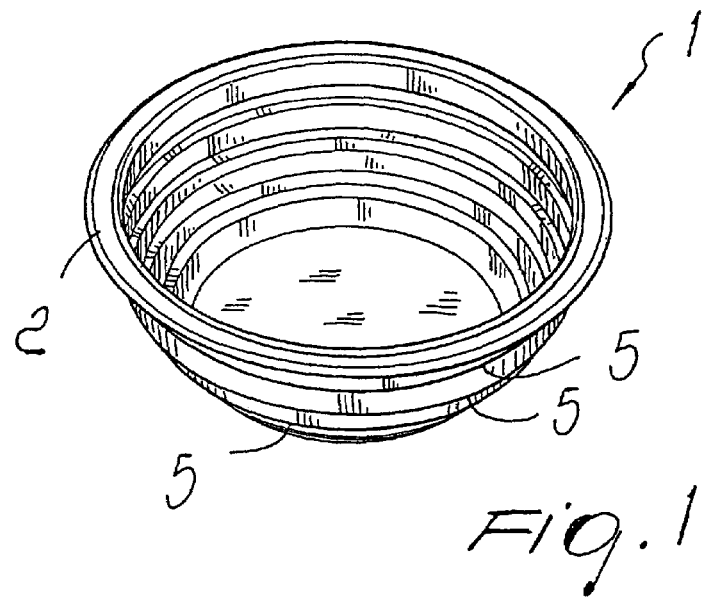
FIG. 1 is a perspective view of the bowl structure according to the present innovation.
Figure 2:
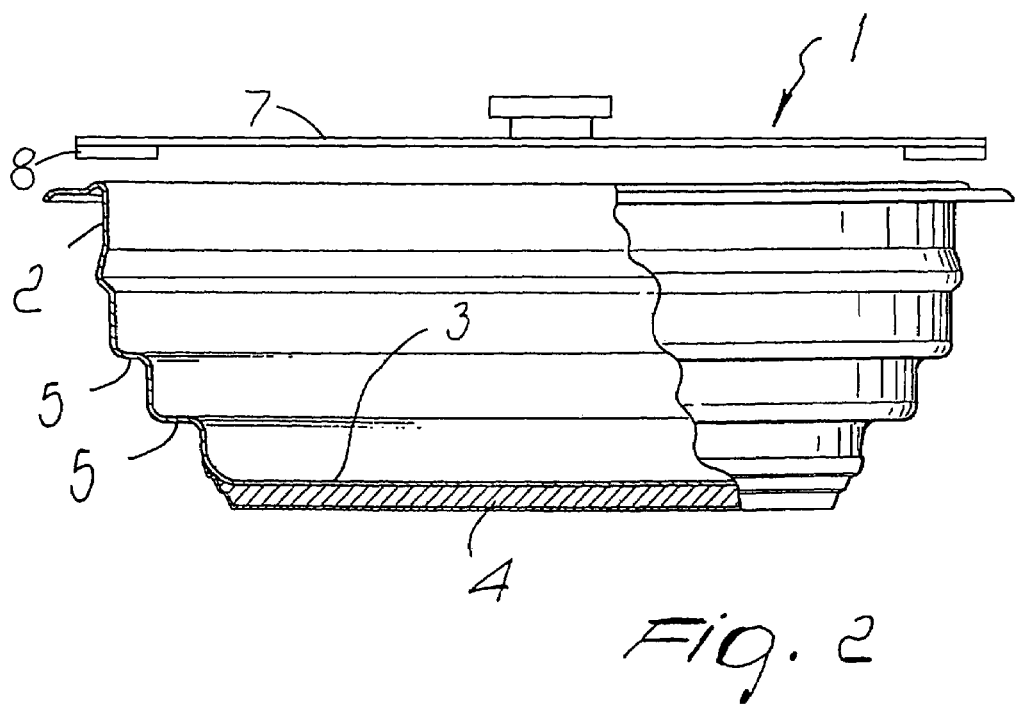
FIG. 2 is a cross section through the bowl according to the present innovation.

With reference to the abovementioned figures, the bowl structure according to the present innovation, which has the overall reference number 1, comprises an internally hollow containment body 2 capable of containing food to be cooked or warmed, having a base 3, to which a thermal base element 4 is fixed, allowing much more efficient, faster transmission of the heat than occurs normally in bowl structures that do not have a thermal base.

The presence of the thermal base 4 means that the energy of the steam underneath it is used very much more efficiently.

The bowl structure according to the innovation also possesses, in the region immediately above the region where the thermal base 4 is located, a portion comprising a plurality of steps 5, preferably three steps 5 defined in such a way that the bowl according to the innovation can be stood on saucepans of different diameters for bain-marie warming of the food contained in the bowl structure 1.

The bowl structure according to the present innovation may be provided with a lid 7 with a silicone seal 8 to cover the bowl.

The presence of the three steps 5, which are designed to give the bowl structure adaptability to saucepans of different diameters on which the bowl may be stacked, means that the bowl can be used for bain-marie cooking of food, that is to say resting the bowl by means of the steps 5 on the top of a saucepan already filled with water, which saucepan is then itself placed in direct contact with a source of heat.

Because of the presence of the thermal base 4, the bowl according to the innovation makes much more efficient use of the energy of the steam coming from the saucepan beneath it, or alternatively the bowl can be used directly in contact with a heat source, and moreover can be used for serving the food at the table while keeping it hot for a long period of time.

Expediently, the three steps 5 are connected to each other by curved lines, or they may be connected at right angles, without influencing the functionality of the bowl, but purely affecting its aesthetic appearance.

It has been found in practice that the bowl structure according to the present innovation completely fulfils the task and objects for which it was designed, in that it can be placed directly in contact with a heat source, or be used for cooking food bain-marie style, being able to be stacked on saucepans of different diameters.

In practice, the materials employed, provided they are compatible with the specific use, and the dimensions and shapes defined by circumstances, may be freely varied to suit requirements and the state of the art.

I claim:

1. A double boiler bowl structure comprising:
   a hollow containment body capable of containing food to be cooked or warmed, which hollow containment body has a base; and
   a thermal base fixed to the base of the hollow containment body, the thermal base capable of transmitting heat from an external heat source into the hollow containment body;
   said hollow containment body further comprising a plurality of concentric, annular steps of upwardly increasing diameter formed in a portion of an outer region of the hollow containment body that is immediately adjacent to and above the thermal base, each annular step extending continuously around the entire circumference of the container body, each annular step having a substantially flat underside to enable the double boiler bowl structure to be stacked in corresponding saucepans of different diameter.

2. Bowl structure according to claim 1, characterized in that it comprises three steps connected to each other by a curved line.

3. Bowl structure according to claim 1, characterized in that it comprises three steps connected to each other at right angles.

4. Bowl structure according to claim 1, wherein the thermal base is fixed to the outside of the base of the hollow containment body.

5. Bowl structure according to claim 2, wherein the thermal base is fixed to the outside of the base of the hollow containment body.

6. Bowl structure according to claim 3, wherein the thermal base is fixed to the outside of the base of the hollow containment body.

* * * * *